F. SCHLETH.
APPARATUS FOR TESTING THE SIGHTING DEVICE OF ORDNANCE.
APPLICATION FILED SEPT. 8, 1920.
1,400,772.
Patented Dec. 20, 1921.
4 SHEETS—SHEET 1.
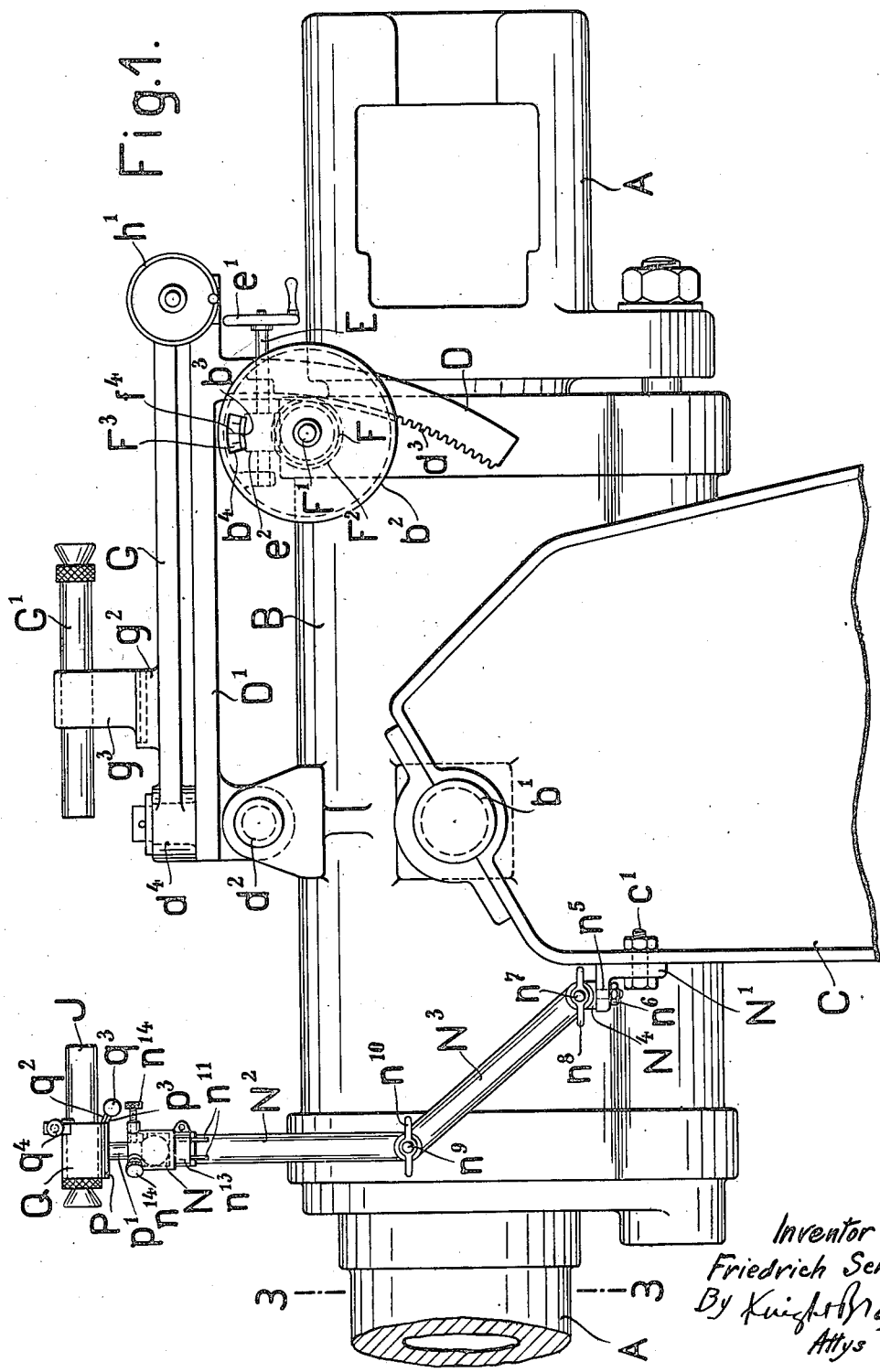

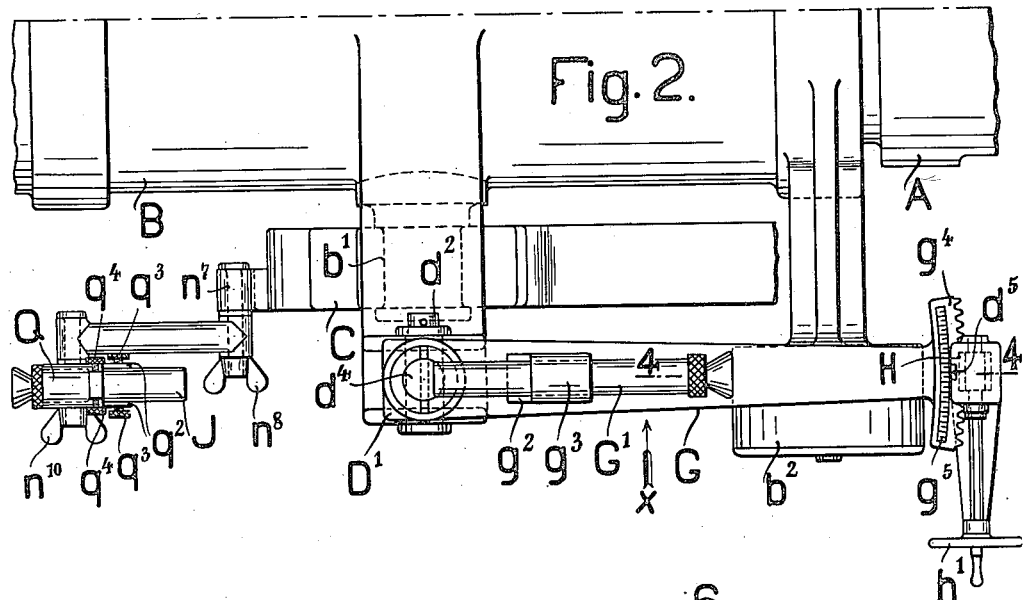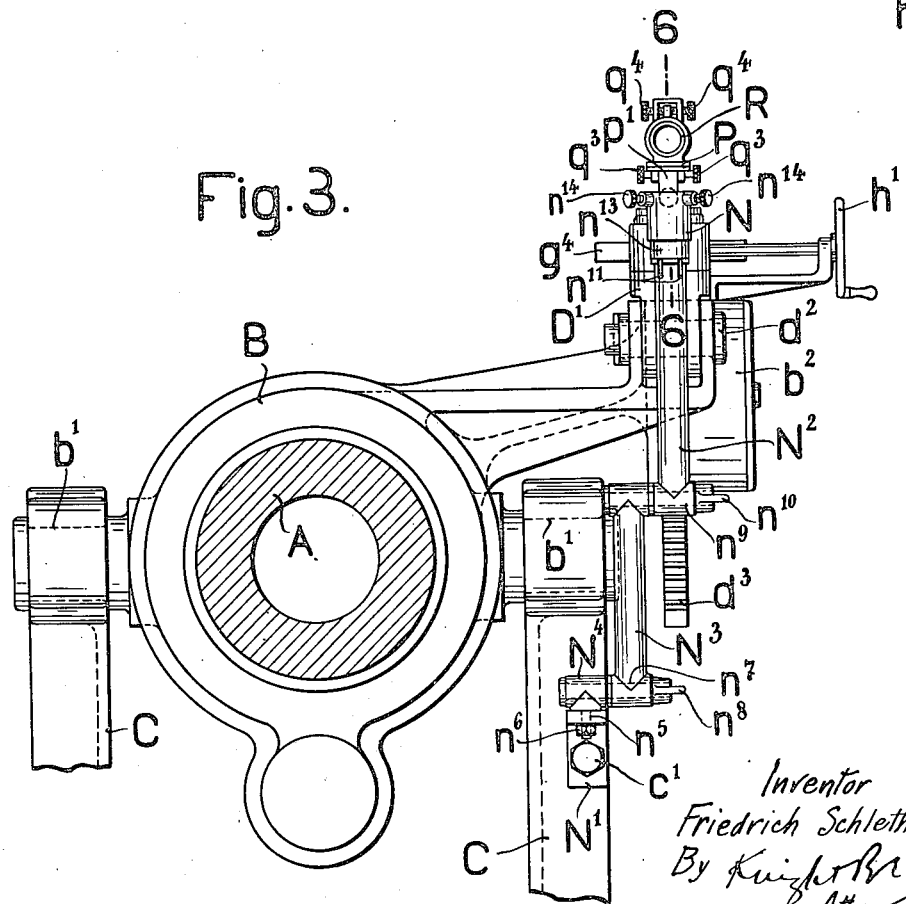

F. SCHLETH.
APPARATUS FOR TESTING THE SIGHTING DEVICE OF ORDNANCE.
APPLICATION FILED SEPT. 8, 1920.
1,400,772.                    Patented Dec. 20, 1921.
4 SHEETS—SHEET 3.
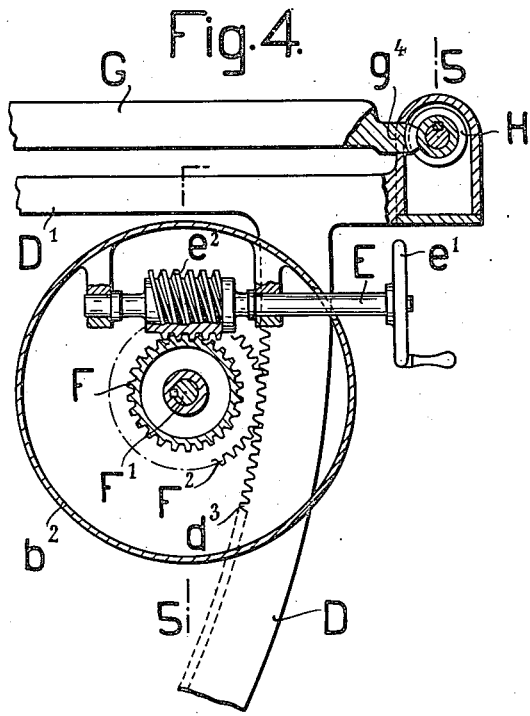
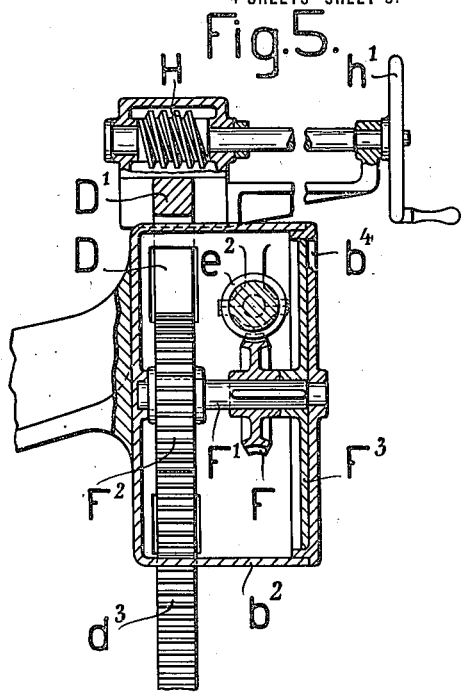
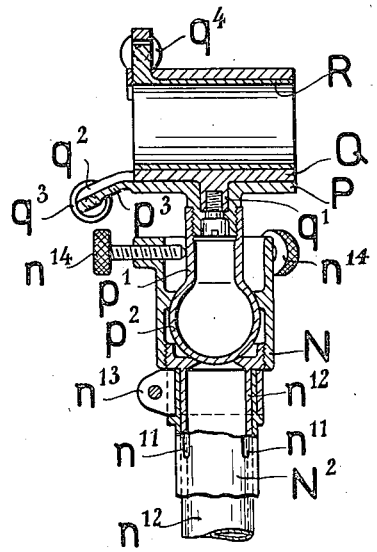
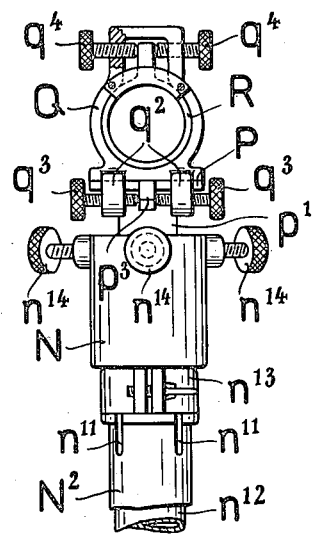
Inventor
Friedrich Schleth
By Knight Bros
Attys.

F. SCHLETH.
APPARATUS FOR TESTING THE SIGHTING DEVICE OF ORDNANCE.
APPLICATION FILED SEPT. 8, 1920.
1,400,772.
Patented Dec. 20, 1921.
4 SHEETS—SHEET 4.
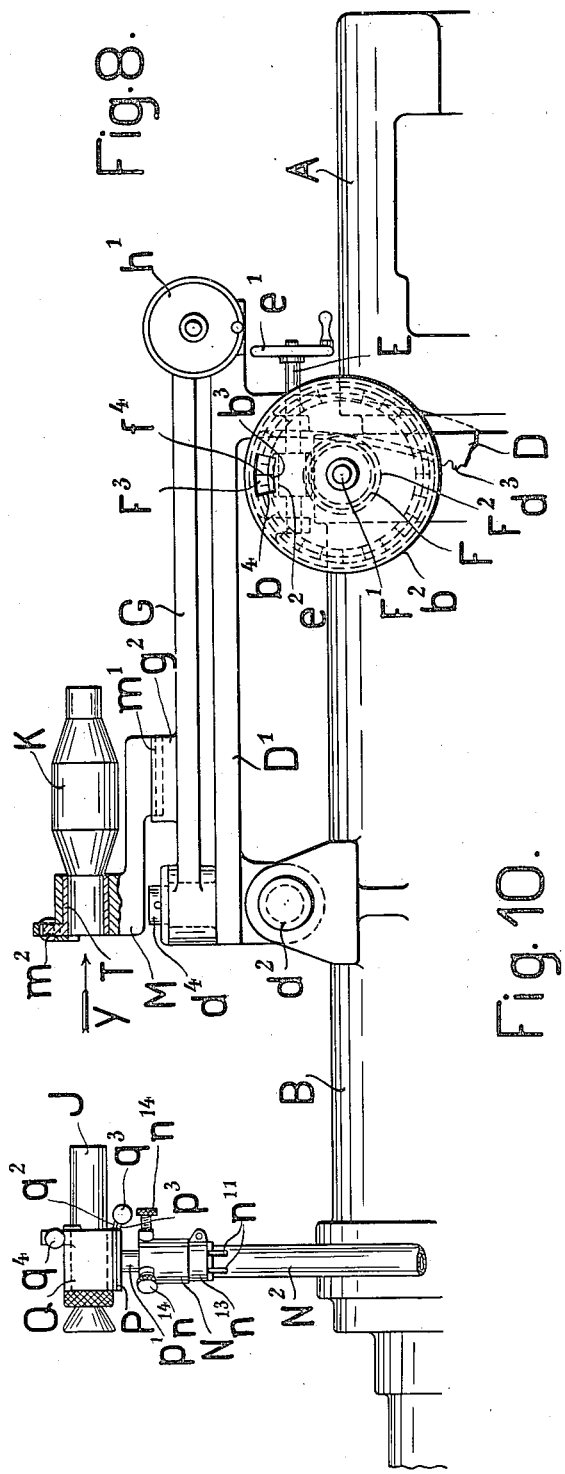
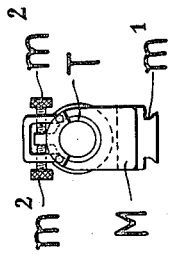
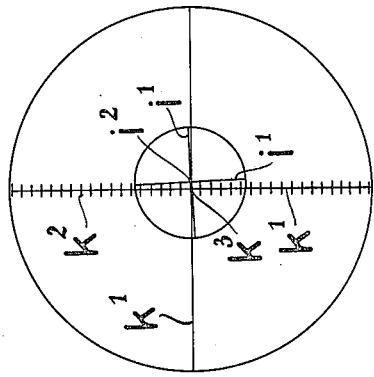
Inventor
Friedrich Schleth
By Knight Bros
Attys.

UNITED STATES PATENT OFFICE.

FRIEDRICH SCHLETH, OF ESSEN, GERMANY, ASSIGNOR TO FRIED. KRUPP AKTIEN-GESELLSCHAFT, OF ESSEN-ON-THE-RUHR, GERMANY.

APPARATUS FOR TESTING THE SIGHTING DEVICE OF ORDNANCE.

1,400,772. Specification of Letters Patent. Patented Dec. 20, 1921.

Application filed September 8, 1920. Serial No. 408,997.

*To all whom it may concern:*

Be it known that I, FRIEDRICH SCHLETH, residing at Essen, Germany, a citizen of the German Republic, have invented a certain new and useful Improvement in Apparatus for Testing the Sighting Device of Ordnance, (for which I have filed an application in Germany Aug. 10, 1918,) of which the following is a specification.

This invention refers to an apparatus for testing the sighting device of ordnance, the distinguishing feature of which is, that even in very confined limits of space as on board ships, for example, it enables a test to be conveniently carried out and furthermore is independent of any movement of the gun mounting.

The invention will be described with reference to the accompanying drawings in which—

Figure 1 is a side elevation of the gun provided with the apparatus for testing the sighting device, Fig. 2 is the one half of the plan view corresponding to Fig. 1, Fig. 3 is a front elevation, partially in section on the line 3—3 of Fig. 1, and on a larger scale, Fig. 4 is a section on the line 4—4 of Fig. 2 looking in the direction of the arrow, Fig. 5 is a section on the line 5—5 of Fig. 4 looking from the left, Fig. 6 is a section on the line 6—6 of Fig. 3 looking from the left, Fig. 7 is the side elevation corresponding to Fig. 6 and on the same scale as Figs. 1 to 3, Fig. 8 is a portion of Fig. 1 with the alteration that a portion of the sighting device is replaced by another part, Fig. 9 is an end view of this part looking in the direction of the arrow $y$ in Fig. 8 and Fig. 10 is a diagrammatic view which serves to explain the manner in which the apparatus works.

Referring to the drawings, parts of the apparatus already known and which does not form the subject matter of the present invention, will be firstly described.

A denotes the gun barrel, which, when the gun is fired, moves longitudinally in a cradle B carried by means of the trunnions $b^1$ in the gun carriage C. The sighting device is arranged on the cradle B and has an attachment bar D, which is mounted on an arm $D^1$. This latter is pivotally mounted on the cradle B by means of a pin $d^2$ arranged parallel with the trunnion $b^1$. The angle of the attachment, which corresponds to the range, is adjusted by means of a shaft E, provided with a hand wheel $e^1$ and carrying a worm $e^2$ and mounted in a casing $b^2$ situated on the cradle (see particularly Figs. 4 and 5). The worm $e^2$ gears with a worm wheel F, which is fixed on a shaft $F^1$ carried in the casing $b^2$. This shaft F carries on one end a spur wheel $F^2$, which gears into a series of teeth $d^3$ cut on the attachment bar D and on its other end a graduated disk $F^3$, which is inscribed with a graduation corresponding to the angle of the attachment and is visible through a window $b^4$ in the casing $b^2$ and provided with a reading off mark $b^3$.

The arm $D^1$ is provided with a pin $d^4$ arranged at right angles to the pin $d^2$ and about which an arm G carrying a sighting telescope $G^1$ (the sighting means) rotates. The sighting telescope $G^1$ is mounted on a guide $g^2$ provided with a dovetail groove and mounted on the arm G into which groove a sliding piece $g^3$ mounted on the casing of the telescope can be pushed. The arm G carries on its free end a toothed sector $g^4$ (see particularly Fig. 2), which engages a worm H, serving for the adjustment of the lateral movement and is mounted on the arm $D^1$ and can be rotated by means of the hand wheel $h^1$. The lateral movement is read off on a graduation arranged on the sector $g^4$ (see Fig. 2) and a mark $d^5$ on the bearing of the worm H. So far the apparatus is known and does not form part of the present invention.

According to the present invention there is provided an auxiliary telescope J, a holder, which serves for the mounting of the auxiliary telescope on the gun carriage and a collimator K (see Fig. 8) together with the corresponding bearing M. The holder provided for the auxiliary telescope J consists substantially of a head piece N with the necessary parts for the mounting and adjustment of the auxiliary telescope, a foot piece $N^1$ attached to the gun carriage by means of a screw bolt $c^1$ and three members $N^2$, $N^3$, $N^4$ pivotally connected to each other and establishing connection between the head piece and the foot piece.

The member $N^4$ is pivotally connected to the foot piece $N^1$ by means of a pin $n^5$, the axis of which, when the foot piece is attached to the gun carriage is substantially vertical and can be locked in any angular position relatively to the foot piece by means of a nut $n^6$ screwed on to a screw-threaded portion of the pin $n^5$. The tubular-shaped member $N^3$ is connected to the member $N^4$ by a pivot bolt $n^7$, the axis of which is at right angles with the axis of the pin $n^5$ and which can be locked in any desired angular position relatively to the member $N^4$ by a wing nut $n^8$ screwed on to screw-threaded portion of the bolt $n^7$. The member $N^2$ is also made of tubular shape and connected to the member $N^3$ by a pivot bolt $n^9$ lying parallel with the bolt $n^7$ and carrying a wing nut $n^{10}$, which serves to secure the two members.

Into the tubular member $N^2$, which is provided with longitudinal slots $n^{11}$ at its upper end, is pushed the head piece N by means of a tubular stem $n^{12}$ rigidly attached thereto (see Figs. 6 and 7), so as to be capable of being withdrawn being locked at a suitable height by means of a clamping band $n^{13}$ surrounding the slit portion of the tubular member $N^2$.

In the head piece N a plate P is mounted by means of a ball and socket joint $p^2$ carried on a cylindrical stem $p^1$, which is adjustable as may be desired by means of three set screws $n^{14}$ arranged on the head piece N and placed at an angle of 120° to each other. Upon the plate P lies a sleeve Q which is rotatably connected therewith by means of a pin $q^1$ lying co-axially with the cylindrical stem $p^1$ (see Fig. 6). The sleeve Q is provided on its face at one end with two bearing eyes $q^2$, which lie on both sides of an arm $p^3$ arranged on the plate B and each of which receives a set screw $q^3$, which is adapted to bear with its free end against the arm $p^3$. The sleeve Q can therefore be rotated by a certain amount by means of the set screws $q^3$ on the plate B with great accuracy in all directions. In the sleeve Q a bearing sleeve R is rotatable by means of the set screws arranged thereon, which is intended for the reception of the auxiliary telescope J.

The auxiliary telescope J, which is provided with a pair of cross wires $i^1$ (see Fig. 10) is capable of being rotated in the bearing sleeve R with slight friction and the axis of rotation of which coincides with the optical axis of the telescope and at the same time also with the axis about which the bearing sleeve R rotates, when an adjustment relatively to the sleeve Q is made by means of the set screws $q^4$.

The bearing M provided for the collimator K (see Fig. 8) is formed with dovetail-shaped guide ribs $m^1$, which fit into the grooves in the guide $g^2$, so that the bearing M can be pushed into the guide $g^2$ instead of the sliding piece $g^3$ carrying the telescope G. In the bearing M a sleeve T can be moved by means of two set screws $m^2$ (see Figs. 8 and 9) arranged thereon, which sleeve T is intended for the reception of the collimator. The collimator K, which is provided with a pair of cross wires $k^1$ (see Fig. 10) and an angle graduation $k^2$ along one of the members of the cross wires, can be rotated with slight friction in the sleeve T, the axis of rotation coinciding with an optical axis and at the same time also with the axis about which the sleeve T rotates, when an adjustment is made relatively to the bearing M by means of the set screws $m^2$. The arrangement is so devised that the optical axis of the collimator falls in the same straight line with that which the sighting line of the sighting telescope $G^1$ registers, before the bearing M is pushed into the guide $g^2$.

By means of the above described arrangement it can be tested whether (1) The axis of the pin $d^2$ (see Fig. 2), about which the sighting telescope $G^1$ swings, when the attachment angle is adjusted by turning the hand wheel $e^1$, is parallel with the axis of the trunnions, (2) the axis of the pin $d^4$, about which the sighting telescope $G^1$ swings, when the adjustment of the lateral movement is made by turning the hand wheel $h^1$ forms a right angle with the axis of the trunnions, whether (3) the correct attachment angle is indicated on the graduation $f^4$ and (4) whether the correct lateral movements are indicated on the graduation $g^5$, see Fig. 2.

To carry out the testing operation, the sighting device is first adjusted at any desired elevation of the gun barrel by means of the hand wheels $e^1$ and $h^1$ so that the sighting line is parallel with the longitudinal axis of the gun barrel. This adjustment is effected in the well known manner, which will not be further described here.

After the sighting telescope $G^1$ has been set parallel with the longitudinal axis of the gun, the foot piece $N^1$ of the holder Q, P, N, $N^2$, $N^3$, $N^4$, $N^1$ for the auxiliary telescope J is attached to the gun carriage and the auxiliary telescope J pushed into the bearing sleeve R. The holder Q, P, N, $N^2$, $N^3$, $N^4$, $N^1$ is now so adjusted by the eye that the optical axis of the auxiliary telescope J coincides approximately with the sighting line of the telescope $G^1$ and the parts of the holder N, $N^2$, $N^3$, $N^4$ and $N^1$ locked relatively to each other by tightening up the screw nuts $n^6$, the wing nuts $n^8$ and $n^{10}$ and the clamping band $n^{13}$.

The sighting telescope $G^1$ is next drawn out of the guide $g^2$ and the auxiliary telescope J is so adjusted by means of the set screws $n^{14}$ and $q^3$ in the same position as the sighting telescope was previously, so that its optical axis is parallel with the longitudinal axis of the gun. Finally the bearing M for the collimator K (see Fig. 8) after it has been pushed into the sleeve T is set in position with its guide ribs $m^1$ into the guide $g^2$.

The axis of the collimator K is situated in the same position, which the sighting line of the sighting telescope $G^1$ previously assumed and is therefore parallel with the axis of the auxiliary telescope. Moreover the said axis coincides with the sighting line of the telescope G or diverges very little therefrom. In the field of view of the auxiliary telescope J the middle point $i^2$ of the cross wires $i^1$ must therefore coincide with the middle point $k^3$ of the cross wires $k^1$ of the collimator (see Fig. 10, where the cross wires are shown in a position, in which their middle points do not coincide) as for this purpose there need only be parallelism of the optical axis and a slight mutual divergence of the two axes, which may be present, is of no importance. The testing of the sighting device can now begin as regards the points enumerated under headings 1 to 4.

In order to test whether according to heading 1, the axis of the pin $d^2$ occupies the correct position, the sighting device is adjusted to as large an attachment angle as is possible the middle point $k^3$ of the cross wires $k^1$ of the collimator K vanishing out of the field of view of the auxiliary telescope J. The breech end of the gun barrel is then elevated by an elevating gear (not shown) to such an extent, that the optical axis of the collimator K is set again as accurately as possible in its original position. As the height to which the axis of the collimator is brought under these circumstances, can only differ by a small amount from its original height, the middle point of the cross wires of the collimator again appear in the field of view of the auxiliary telescope J. If the axis of the pin $d^2$ is parallel with the axis of the trunnions, then the middle point $k^3$ of the cross wires $k^1$ of the collimator must again coincide with the middle point $i^2$ of the cross wires $i^1$. If the middle points $i^2$ and $k^2$ show a lateral divergence, as is assumed in Fig. 10, this is a proof that the axis of the pin $d^2$ is not parallel with the axis of trunnions and so the mounting of the pin must be corrected.

After it has been ascertained that the pin $d^2$ is in the right position, then follows according to heading 2, the testing of the position of the pin $d^4$, about which the sighting telescope $G^1$ rotates, when the lateral movement is adjusted. For this purpose the collimator, which is pushed into the sleeve T and in angular position relatively thereto (see Figs. 8 and 9), is so adjusted, that its cross wires $k^1$ receive the correct angular position with relation to the axis of the trunnions, that is to say, a position, in which the limb of the cross wires going toward the right, is parallel with the axis of the trunnions and consequently the limb running from the bottom to the top is at right angles thereto.

When the cross wires have received the correct position, the middle point of the cross wires $i^1$ of the auxiliary telescope J must remain on the limb of the cross wires $k^1$ of the collimator, which runs from the bottom to the top, when an alteration in the attachment angle is made by turning the hand wheel $e^1$. If this be not the case the sleeve T together with the collimator K is rotated by such an amount by means of the set screws $m^2$ (see Figs. 8 and 9) that, when an alteration of the attachment angle is made, the point $i^2$ no longer diverges from the limb of the cross wires, which runs from the bottom to the top. After the cross wires have been adjusted in the manner described and the collimator K so adjusted, that the points $k^3$ and $i^2$ coincide, as large a lateral adjustment as possible is imparted by turning the hand wheel $h^1$. If, when this is done the point $i^2$ remains on the limb of the cross wires $k^1$, which runs from the right to the left, the pin is in the correct position, that is to say, its axis forms a right angle with the axis of the pin $d^2$, otherwise the position of the axis of the pin must be correspondingly corrected.

Now follows according to heading 3 the testing of the graduation $f^4$ of the sighting device, which corresponds to the attachment angle. In this case let it be assumed, that the cross wires $k^1$ have been previously so adjusted, that the limb provided with the graduation $k^2$ runs from the bottom to the top. If a certain attachment angle be adjusted by means of the hand wheel $e^1$, the middle point $i^2$ of the cross wires $i^1$ indicates a certain attachment angle on the graduation $k^2$. If the graduation $f^4$ to be tested is correct, the reading off mark $b^3$ of the sighting device must coincide with a point on the graduation $f^4$, which corresponds to the same attachment angle otherwise correction is necessary.

Finally in order to test the graduation $g^5$ corresponding to the lateral movement according to heading 4 (see Fig. 2) the collimator K is first again so adjusted, that the middle point $k^3$ of the cross wires coincides with the middle point $i^2$ of the cross wires $i^1$. Then by means of the set screw $q^4$ the sleeve R together with the telescope J is rotated by such an amount, that the cross wires $i^1$ coincides with the cross wires $k^1$. Also the collimator is rotated in the sleeve T by the eye through about 90° and then by making use of the set screw $m^2$ (see Figs. 8 and 9) so adjusted, that the limb of the cross wires provided with the graduation $k^2$ coincides with the limb of the cross wires $i^1$ of the auxiliary telescope J running from right to left. By means of the hand wheel $h^1$ a certain lateral movement is next adjusted on the graduation $g^5$ (see Fig. 2). If the graduation $g^5$ is correct, the middle point $i^2$ of the cross wires $i^1$ must indicate on the graduation $k^2$ the same angle as the mark $d^5$ on the graduation $g^5$, otherwise a correction is required.

As can be seen at once, it would also be possible without materially modifying the invention, to so devise the arrangement, that the collimator K and the auxiliary telescope are interchangeable so that instead of the auxiliary telescope the collimator can be pushed into the sleeve R and the collimator pushed into the sleeve T instead of the auxiliary telescope. Again, when the arrangement is used with the collimator which is pushed into the sleeve T the sighting telescope $G^1$ might also be used instead of the auxiliary telescope J.

The method of testing described with reference to the drawing is specially advantageous in that the auxiliary telescope J remains permanently in position during the testing and therefore the fine adjustment imparted to the sleeve Q by the set screws $n^{14}$ and $q^3$ cannot be wasted by the withdrawal of the auxiliary telescope from the sleeve R and the pushing in of the collimator.

Claims:

1. An arrangement for testing the sighting apparatus of ordnance having a gun barrel, a gun carriage and sighting telescope said arrangement comprising an auxiliary telescope, means for mounting said auxiliary telescope on said gun carriage for angular adjustment to position its optical axis parallel with the longitudinal axis of the gun barrel and adjacent the sighting line of the sighting telescope when the latter is similarly adjusted.

2. An arrangement for testing the sighting apparatus of ordnance having a gun barrel, a gun carriage and sighting telescope, said arrangement comprising an auxiliary telescope, a holder therefor, said holder being formed of sections adjustably united, whereby the optical axis of the auxiliary telescope may be adjusted parallel with the longitudinal axis of the gun barrel and adjacent the sighting line of the sighting telescope when the latter is similarly adjusted.

3. An arrangement for testing sighting apparatus of ordnance having a gun barrel, a gun carriage and sighting telescope, said arrangement comprising an auxiliary telescope, a holder for said auxiliary telescope, means for detachably mounting said holder to the gun carriage, said holder being formed of sections united to permit angular adjustment with respect to one another, a bearing sleeve rotatably carried by said holder for receiving said auxiliary telescope, the axis of rotation of which lies in the same direction as the optical axis of the auxiliary telescope, substantially as and for the purpose described.

4. An arrangement for testing the sighting apparatus of ordnance having a gun barrel, a gun carriage and a sighting telescope, said arrangement comprising an auxiliary telescope, an adjustable holder for said auxiliary telescope, means for mounting said holder on said gun carriage, a removable holder for said sighting telescope, a collimator, said collimator adapted to replace said sighting telescope, substantially as and for the purpose described.

5. An arrangement for testing the sighting apparatus of ordnance having a gun barrel, a gun carriage, a sighting means and a sighting means carrier, said arrangement comprising an auxiliary telescope, an adjustable holder for said auxiliary telescope, means for mounting said holder on the gun carriage, means removably supporting said sighting means on said sighting means carrier, a collimator, said collimator adapted to replace said sighting means, substantially as described.

6. An arrangement for testing the sighting apparatus of ordnance having a gun barrel, a carriage therefor, a sighting means and a sighting means carrier, said arrangement comprising an auxiliary telescope, an adjustable holder for supporting said auxiliary telescope, means for mounting said holder on said carriage, said sighting means being removably supported on said sighting means carrier, a collimator, a holder for said collimater, a rotatable bearing for mounting said collimator upon said holder, said collimator being adapted to replace the removable sighting means.

7. An arrangement for testing the sighting apparatus of ordnance having a gun barrel and a gun carriage, said apparatus being adjustably mounted on the gun barrel for establishing a sighting line, said arrangement comprising an auxiliary optical instrument having cross wires for fixing its optical axis in said sighting line and means for mounting said auxiliary optical instrument on said gun carriage for angular adjustment to position its optical axis parallel with the longitudinal axis of the gun barrel adjusted to a suitable elevation and adjacent the sighting line of the sighting apparatus when the latter is similarly adjusted.

8. An arrangement for testing the sighting apparatus of ordnance having a gun barrel and a gun carriage, said apparatus being adjustably mounted on the gun barrel for establishing a sighting line, said arrangement comprising an auxiliary optical instrument having cross wires for fixing its optical axis in said sighting line, a holder for said auxiliary optical instrument detachably mounted on the gun carriage, a bearing sleeve rotatably carried by said holder for receiving said auxiliary optical instrument, the axis of rotation of which lies in the same direction as the optical axis of the auxiliary optical instrument, and means for adjusting said auxiliary optical instrument relatively to the gun carriage to position its optical axis parallel with the longitudinal axis of the gun barrel adjusted to a suitable elevation and adjacent the sighting line of the sighting apparatus when the latter is similarly adjusted.

9. An arrangement for testing the sighting apparatus of ordnance having a gun barrel, a gun carriage, a sighting means for establishing a sighting line, a carrier therefor on which said sighting means is detachably mounted, means for angularly adjusting the sighting line of the sighting apparatus relatively to the gun barrel and a scale for indicating the angular adjustment imparted to the sighting line, said arrangement comprising an auxiliary optical instrument having cross wires for fixing its optical axis in said sighting line, a holder for said auxiliary optical instrument detachably mounted on the gun carriage, means for adjusting said auxiliary optical instrument relatively to the gun carriage to position its optical axis parallel with the longitudinal axis of the gun barrel adjusted to a suitable elevation and adjacent the sighting line of the sighting apparatus when the latter is similarly adjusted, and a second optical instrument, one of said optical instruments being a collimator having a scale corresponding to the scale of the sighting apparatus and the other being a telescope having cross wires for fixing its optical axis and one of said optical instruments being detachably mounted on the carrier of the sighting apparatus.

10. An arrangement for testing the sighting apparatus of ordnance having a gun barrel, a gun carriage, a sighting means for establishing a sighting line, a carrier therefor on which said sighting means is detachably mounted, means for angularly adjusting the sighting line of the sighting apparatus relatively to the gun barrel and a scale for indicating the angular adjustment imparted to the sighting line, said arrangement comprising an auxiliary telescope having cross wires for fixing its sighting line in the first mentioned sighting line, a holder for said auxiliary telescope detachably mounted on the gun carriage, means for adjusting said auxiliary telescope relatively to the gun carriage to position its sighting line parallel with the longitudinal axis of the gun barrel adjusted to a suitable elevation and adjacent the sighting line of the sighting apparatus when the latter is similarly adjusted, and a collimator having a scale corresponding to the scale of the sighting apparatus, said collimator being detachably mounted on the carrier provided for said detachable sighting means to replace the sighting means.

11. An arrangement for testing the sighting apparatus of ordnance having a gun barrel, a gun carriage, a sighting means for establishing a sighting line, a carrier therefor on which said sighting means is detachably mounted, means for angularly adjusting the sighting line of the sighting apparatus relatively to the gun barrel and a scale for indicating the angular adjustment imparted to the sighting line, said arrangement comprising an auxiliary telescope having cross wires for fixing its sighting line in said first mentioned sighting line, a holder for said auxiliary telescope detachably mounted on the gun carriage, means for adjusting said auxiliary telescope relatively to the gun carriage to position its sighting line parallel with the longitudinal axis of the gun barrel adjusted to a suitable elevation and adjacent the sighting line of the sighting apparatus when the latter is similarly adjusted, a collimator having a scale corresponding to the scale of the sighting apparatus, and a bearing in which said collimator is rotatable about an axis lying in the same direction as its optical axis, said collimator bearing being detachably mounted on the carrier provided for said detachable sighting means in a position in which the optical axis of the collimator lies in the direction fixed by the sighting line of the sighting apparatus.

The foregoing specification signed at Essen, Germany, this 27th day of May, 1920.

FRIEDR. SCHLETH.

In presence of—
HANS GOTTSMANN,
JOSEF OLBERTZ.